July 8, 1924.

S. G. BONAPARTE

DRIER

Filed April 13, 1922

Inventor:
Swan G. Bonaparte
By Fischer & Lagaard
his Attorneys.

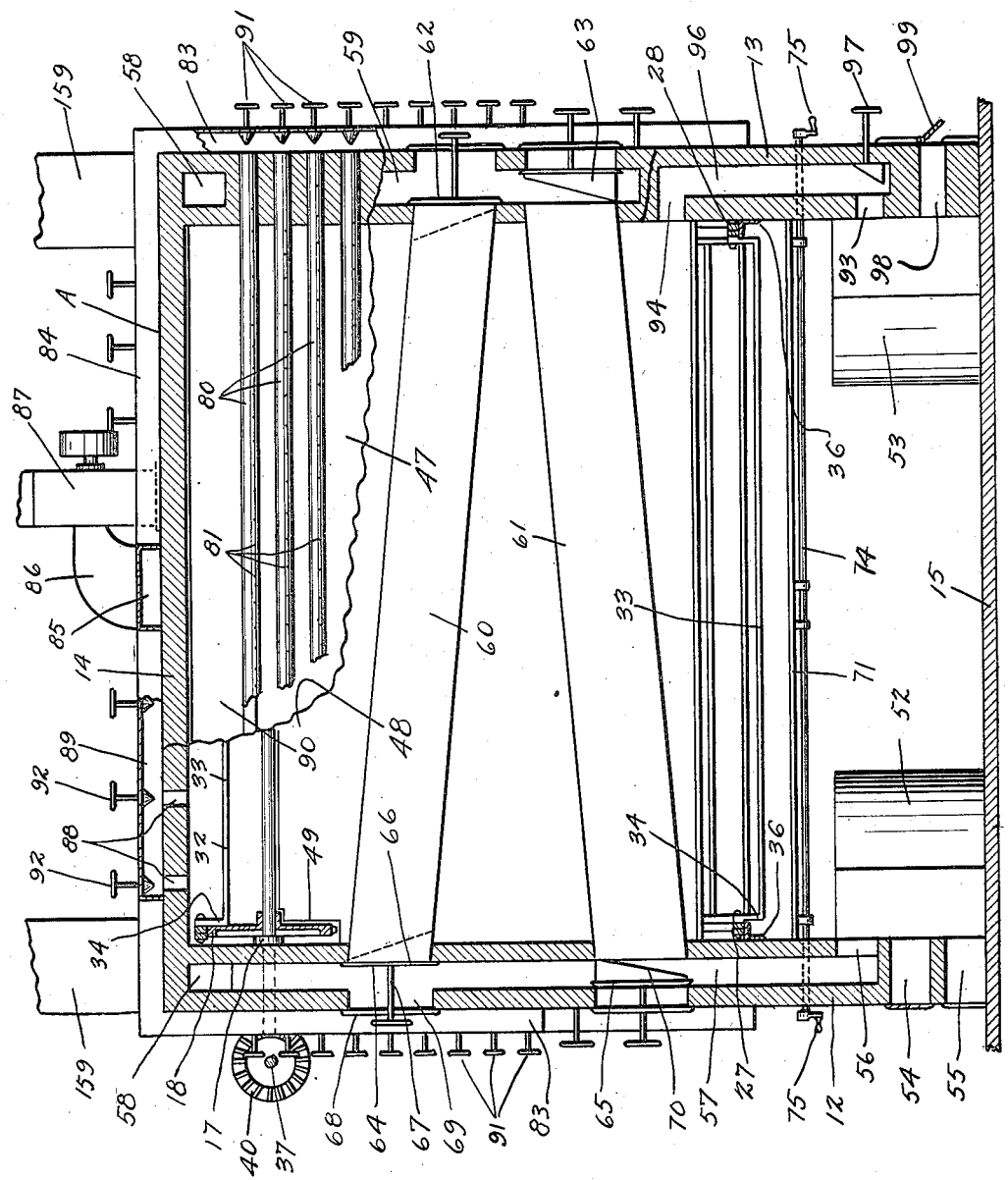

Patented July 8, 1924.

1,500,862

UNITED STATES PATENT OFFICE.

SWAN G. BONAPARTE, OF ST. PAUL, MINNESOTA.

DRIER.

Application filed April 13, 1922. Serial No. 552,281.

*To all whom it may concern:*

Be it known that I, SWAN G. BONAPARTE, a subject of the King of Sweden, residing at St. Paul, in the county of Ramsey and State of Minnesota, have invented a new and useful Improvement in Driers, of which the following is a specification.

My invention relates to drying machines and has for its object to provide a machine which is continuous in operation and which is adapted to receive a moist substance at one end and discharge the same in a perfectly dry condition.

Another object is to form the machine so that the moisture is gradually removed from the substance so that spoiling of the same is prevented by too rapid removal of the moisture.

Another object is to successively pass the substance through a series of chambers, each of which is adapted to extract from the substance a certain amount of moisture as the substance passes through the same so that the substance in the same chamber always contains substantially the same amount of moisture.

A still further object is to provide a continuous carrier which is adapted to successively carry the substance to be dried through the various drying chambers so that the substance upon leaving the drier is dried the desired amount.

Another object is to arrange the runs of said continuous carrier in vertical position within said chambers and to provide the partitions forming said chambers in a vertical position between alternate runs of said carrier.

A still further object is to arrange the walls of said chambers so that the chambers are formed in zig zag relation to one another, each run of the conveyer being confined to one of said chambers.

Another object is to provide suction means within each of the chambers for removing the moist air from the said chambers and to provide heating means for raising the temperature within the chamber.

A still further object is to provide heaters positioned at the bottom of the machine with flues issuing therefrom and connected with said heating means within the chambers for supplying the heat thereto.

A still further object is to form the carrier with a long horizontal run at the bottom of the same, which is positioned substantially over the said heaters and adapted to receive the most intense heat in the machine for bringing the substance up to the desired temperature at which most efficient evaporation will take place.

A still further object of the invention is to provide a sectional partition between said heaters and horizontal run of said conveyer for excluding the heat from said heaters to said run.

Another object is to provide means for independently opening and closing any of said sections of said partitions so that the heat within the heater chamber may be transmitted to any portion of the horizontal run of said conveyer.

Another object is to arrange the upper supporting sprockets for said vertical runs of said conveyer substantially in a single plane and to drive the conveyer simultaneously through all of said upper sprockets so as to produce an efficient drier therefor.

The full objects and advantages of my invention will appear in connection with the detailed description thereof and are particularly pointed out in the claims.

In the drawings forming part of this specification,

Fig. 2 is a transverse sectional view of the machine shown in Figure 1 with parts broken away to show the various features of the invention.

Figure 1:
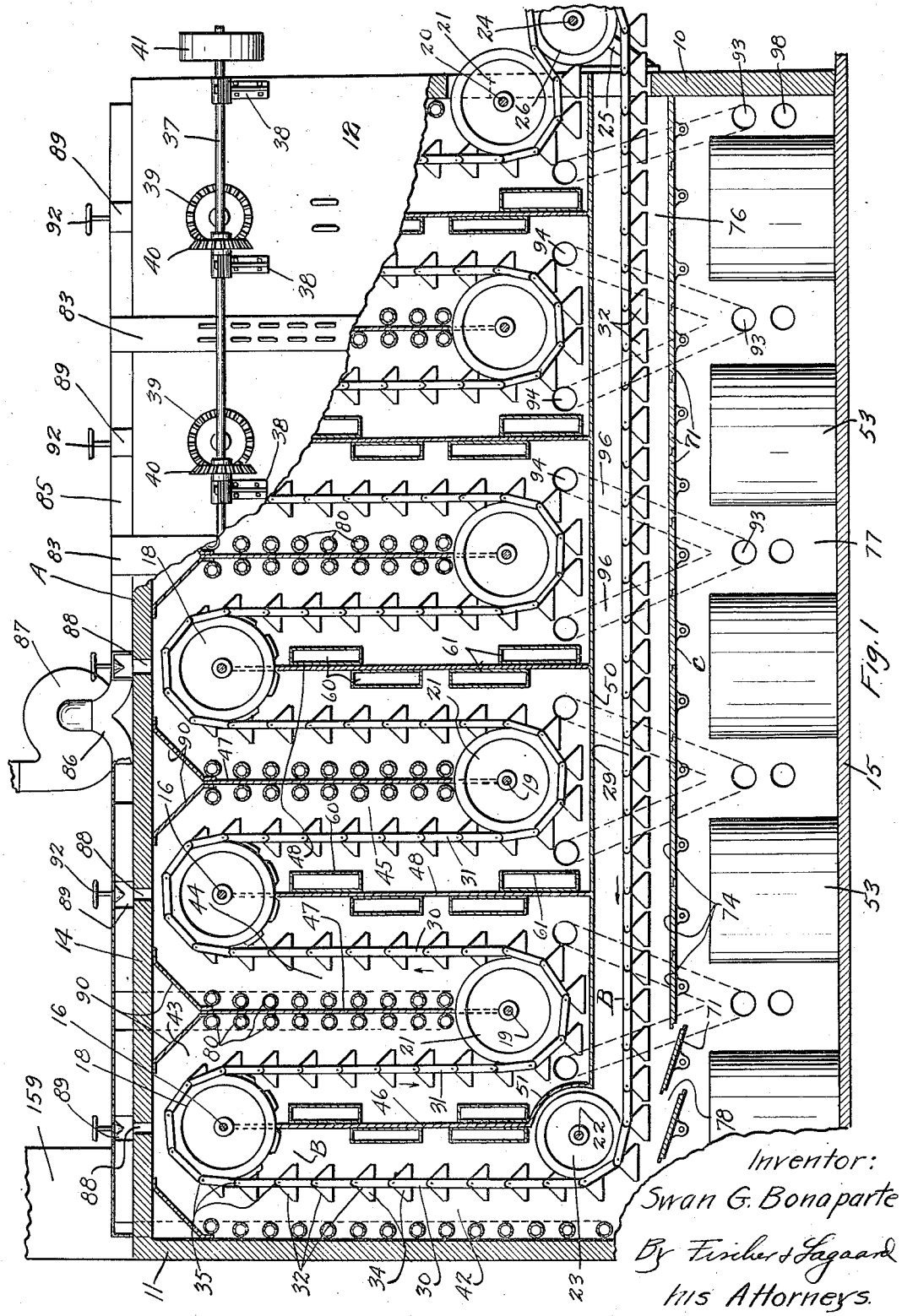
Fig. 1 is a longitudinal sectional view of my invention showing a portion of the same in exterior elevation.

My invention consists primarily of an exterior casing indicated in its entirety at A which may be built of brick, tile, concrete, or any other suitable material and which is provided with end walls 10 and 11, side walls 12 and 13, a top 14 and floor 15. This exterior casing may be. constructed in conformity with the principals of structural design now in common use which will not be entered into in detail in this application.

Within the casing A, I position the major portion of the mechanism of my invention. The same consists primarily in a continuous carrier or conveyer indicated in its entirety at B which is constructed as follows. Along the upper portion of the casing A, I provide a number of transversely positioned shafts 16 which extend across the entire casing and are journalled in bearings 17 secured to the walls 12 and 13 of the said casing. These shafts are arranged in a horizontal plane in parallel relation to one another and have mounted thereon within the said casing adjacent the walls 12 and 13 thereof a number of sprocket wheels 18 which nearly reach up to the ceiling 14 of the same. Near the center of casing A, I provide a similar number of shafts 19 which are also arranged in a horizontal plane in parallel relation to each other. These shafts are likewise journalled but are positioned in staggered relation to the shafts 16 so that the same fall in perpendicular projection mid-way between the said shafts 16. The last of these shafts shown at 20 falls fairly close to the end wall 10 of the casing. Upon shafts 19 are mounted a number of sprocket wheels 21 which may be of substantially the same diameter as the sprocket wheels 18 and which are arranged in the vertical plane of said first named sprocket wheels. In addition to these shafts and sprocket wheels I provide another shaft 22 which is positioned below the first of the shafts 16 adjacent wall 11 and considerably below the plane of shafts 19. This shaft carries two sprocket wheels 23 which are preferably made of smaller diameter than either of the sprockets 18 or 21 and which are arranged in the same plane as sprockets 18 and 21 and which have the outer face thereof in vertical alignment with the exterior face of sprocket 18 immediately above the same. Shaft 22 is supported and journalled the same as shaft 19 in bearings similar to those shown for shaft 16 which are not indicated in detail in the drawings or the same may be journalled in any other suitable manner. A last shaft 24 positioned in the same plane as shaft 22 is provided, which extends completely outside of the casing A and which is journalled in brackets 25 attached to the exterior of wall 10. This shaft is parallel to shaft 22 and carries two sprocket wheels 26 at the ends thereof which are positioned in the same planes as the sprocket wheels 18, 21, and 23. The conveyer proper consists of two endless chains 27 and 28 which are positioned around the sprocket wheels heretofore described as follows. The said chains first pass on the underside of sprocket wheels 26 in a horizontal run 29 and to the underside of sprocket wheel 23. From there the said chains pass successively upwardly in runs 30 over the wheels 18 and then downwardly in runs 31 and below the wheels 21 until the chains pass below the last wheels 21 positioned on shaft 20. From here the chains pass around the sprocket wheel 26 and to the point of starting. In this manner it can clearly be seen that the two chains form a continuous run extending first along the lower portion of the machine in a horizontal run and then in successive vertical runs going successively up and down along the interior of the casing.

The means for carrying the substance to be dried consists principally of a number of swinging carrier plates 32 which are formed with a flat plate-like portion 33 having upstanding brackets 34 secured to the same at the ends thereof. These carriers are pivoted to the links of the chains 27 and 28 as indicated at 35 so that the same are free to swing on the said links as the chains travel about the various sprockets within the machine. With this construction it can readily be seen that the plates 32 when loaded are caused to hang by gravity in a normally horizontal position regardless of the position of the chains or conveyer so that any substance placed on these plates which serve as shelves or supports for the same will always remain in an upright position irregardless of the travel of the conveyer. For supporting the run 29 conveyer B intermediate of the sets of sprockets 23 and 25 I provide two angles 36 which are bolted to the interior of the walls 12 and 13 of casing A and which serve as tracks upon which the chains 27 and 28 may run until the same reach the sprocket wheels 23 and are picked up by means thereof. In this manner the weight of the said run 29 and the substance carried thereon are carried by the said tracks and the said weight taken off from the chains 27 and 28.

Although I have shown the suspended type of carrier plate for holding the substance in constant horizontal position, yet it can be readily understood that any of the other types of carriers now in common use for this purpose may be employed.

The driving means for driving the conveyer B can best be seen in Figure 1, and is constructed as follows. As before stated all of the shafts 16 at the upper portion of the machine are arranged in a single horizontal plane and in parallel relation to one another. A driving shaft 37 is positioned in the same plane as shafts 16 and is journalled in a number of bearings 38 secured to the exterior of wall 12 in such a manner that the said shaft lies at right angles to the shafts 16 and is spaced from the said wall. Upon each of the shafts 16 on the end thereof is rigidly secured a bevel gear 39 which bevel gears mesh with corresponding bevel gears 40 positioned on shaft 37. Power may be applied to shaft 37 by means of a pulley 41 secured to the extreme end thereof. By this means it can be readily seen that all of the shafts 16 are simultaneously rotated in the same direction by means of the single shaft 37. In this manner the conveyer is driven simultaneously at the top of each vertical run thereof so that tension on the chains 27 and 28 is substantially the same throughout the entire structure. By this construction considerable friction is eliminated and the strain on the conveyer greatly reduced which provides a much more efficient construction, clearly economizing on the consumption of power and making the device more perfect in action.

For removing the moisture from the substance as the same is transported on conveyer B on the carrier plates 32 I divide the entire casing A up into a number of vertically positioned chambers 42, 43, 44, 45, etc. These various chambers are formed by means of vertical partitions 46, 47, and 48 which are positioned mid-way between respective runs 30 and 31 of the conveyer. Partitions 46 and 48 reach from a point below the sprocket wheel 21 and up to and adjacent the various shafts 16. Partitions 47 on the other hand extend from a point shortly below the ceiling 14 of the casing and reach down to the shafts 19. A short distance below the sprocket wheels 21 and at the ends of the partitions 48, I provide a horizontally positioned partition 50 which extends throughout the entire length of the machine and which connects by means of a curved portion 51 with the end partition 46. All of these partitions are cut away as indicated at 49 in Figure 2 where the sprocket wheels 18 are positioned so that substantially closed chambers are formed. To the upper portions of the partitions 47 are secured inclined sections 90 which reach up to the underside of the top 14 to form a tight closure therewith. Above the shafts 16 partitions 46 and 48 are open and below shaft 19 partitions 47 are open so that it can be clearly seen that a continuous zig zag passageway is formed through the continuous conveyer B, no two runs of the same passing through the same chamber.

For heating the system I provide upon the floor 15 a number of heaters 52 and 53 which are placed adjacent the walls 12 and 13 of the machine and which have fire-doors 54 and ash pit door 55 of ordinary construction extending through said walls. These heaters are connected by means of thimbles 56 with vertical flues 57 positioned at regular intervals along the walls 12 and 13. The said flues extend upwardly to the top of the walls where they connect with horizontal flues 58 which in turn lead to chimneys 159 extending upwardly and above the structure of the machine to provide sufficient draft for the operation of said heaters. For directing the heat through the interior of the casing A, I provide an additional flue 59 opposite each of the flues 57 which flues terminate considerably short of the bottom of the wall 13 but which extend upwardly and communicate with the two horizontal flues 58. Between each set of vertical flues 57 and 59, I position inclined ducts 60 and 61 which are made to communicate with the said flues 57 and 59 as can be clearly seen in Figure 2. These ducts are preferably made of sheet iron and are positioned adjacent the partitions 46 and 48 previously referred to, which construction is shown in cross section in Figure 1. The ducts 60 and 61 as shown in Figure 2 are arranged to be closed by means of valves 62 and 63, 64, and 65. These valves are simply formed with covers 66 to which are attached stems 67 which stems are slidably mounted in cover plate 68 positioned over suitable openings 69 through the exterior of the walls 12 and 13 by means of which access to the said duct may be had for the purpose of cleaning the same. In addition to covering said ends by these ducts as shown, the said valves are formed with inclined portions indicated at 70. When the valves are in open position as shown for either valve 65 or 63, said valves not only serve to place the duct 60 or 61 in communication with the flues 57 and 59 but also serve to cut off the said flues either above or below the said ducts as indicated. When the parts are arranged as indicated in Figure 2, flue gases formed in one of the heaters 52 may pass through the corresponding thimble 56, flue 57, through the valve opening formed by valve 65, through duct 61, through the valve opening formed by valve 63, into flue 59 and from there through the horizontal flue 58 and into chimney 159 where the same may escape to the atmosphere. By opening both of the valves 62 and 64 it can readily be seen that communication of the gases in flue 69 below valve 62 would be cut off and that the said flue gases would be caused to travel through duct 60 where the same would then enter the upper portion of flue 57 and from there escape to the horizontal flue 58 and to the chimney 159 on the opposite side of the machine. In this way the flue gases can be caused to pass through either of the ducts 61 or through both of the ducts 60 and 61 so as to heat the interior of the drier as required. It will be noted that each of the heaters 52 and 53 is provided with a set of ducts 60 and 61, the said ducts for heaters 53 being positioned on one side of partitions 46 and 48 and the ducts for the other heaters 52 being positioned on the other side of said partitions. This also makes the said ducts cross each other so that the chambers 42, 43, 44, 45 etc. are uniformly heated throughout. With this construction it can readily be seen that as the carrier plates 32 with the substance to be dried passes successively through the various chambers 42—45 etc. the said substance is successively heated to a degree which can be regulated by the passage of the gases through the ducts 60 and 61 and which may be further regulated by the proper manipulation of the heaters 52 and 53. If desired, by closing all of the valves 62—66 the flue gases from the heaters 52 and 53 may be directly discharged into the chimney without heating any of the space within the drier.

The lower run 29 of the conveyer B is directly heated by the heat admitted from the heaters 52 and 53 themselves. These heaters are not insulated and the heat emanating from the same passes directly upwardly where the substance carried by the run 29 passes so that the said heat passes completely around the substance as the same travels along. Inasmuch as the heat about the heaters is the most intensive the temperature of the air through which the run 29 passes is probably higher than that within any of the chambers 42—45 etc., and the substance upon entering the machine is therefore quickly brought up to the desired temperature at which the most efficient rate of evaporation can be produced before the same enters the said evaporating chambers.

For regulating the heat supplied to run 29 of the conveyer I provide a partition indicated in its entirety at C which partition consists of a number of plates 71 which are mounted on shafts 74 extending through the walls 12 and 13 of casing A, and which have handles 75 attached thereto by means of which the said shafts and plates mounted thereon may be tilted as required. When the said plates are horizontally positioned as shown at the right in Figure 1, the said plates form a continuous partition which separates the space containing the run 29 of the conveyer B forming a chamber 76 for the passage of the same and a chamber 77 for the heaters 52 and 53. When the said plates 71 are tilted as shown at the left in Figure 1 the same forms passageways 78 which permit the heat generated within chamber 77 to pass therethrough and to heat the substance as the same travels along the lower run 29 of the conveyer.

In order to transfer some of the heated air from within the chamber 77 to the various evaporating chambers 42—45 etc., I provide openings 93 positioned in the walls 12 and 13 below the partition C and pairs of openings 94 positioned within the above named evaporating chambers immediately over the partitions 50. These openings in the wall are connected by means of pairs of flues 96 which extend upwardly through said walls and which may be regulated by means of dampers 97. When the heat within the above evaporating chambers is not intense enough the heated air within chamber 77 may be directly admitted into the said chambers instead of by radiation from the ducts 60 and 61. These air passageways are particularly advantageous in starting the plant when it is desirable to quickly heat up the entire interior of the device. For permitting the entrance of air into the chamber 77 I provide a number of openings 98 in walls 12 and 13 immediately below the openings 93, which openings may be controlled by draft regulators 99 shown in section in Figure 2.

In use the conveyer is caused to travel as indicated by the arrows positioned along the same. The substance is first placed upon the carrier plate 22 as the said device passes beneath sprockets 26, so that upon entering the machine proper the substance is caused to travel along the horizontal run 29 of the conveyer proper, the same passing through the chamber 76. As the said substance passes through this chamber the same is directly heated by means of the heaters 52 and 53 until the substance reaches sprocket wheel 23 at which time it has arrived at a temperature sufficiently high so that the same has commenced to give off vapor. As the substance travels upwardly along the first run 30 the heat from the duct 61 and 62 on the left of partition 46 further heats the same and causes the moisture to be rapidly evaporated. As the substance continues about the first sheave 18 and down run 31 the same is further heated by means of ducts 60 and 61 on the right of partition 46 where the moisture from the same is further evaporated by the heat ensued from said ducts.

For removing the steam and moisture from the various chambers 42, 43, 44, and 45 etc. I provide a series of horizontally positioned pipes 80 which are positioned on both sides of the partitions 47, which pipes are perforated at the lower portions as indicated at 81 in Figure 2. These pipes all pass directly through the walls 12 and 13 of casing A and are connected on the exterior of the casing by means of metal ducts 83 attached thereto. Ducts 83 extend up to the top of the casing A where they connect with horizontally positioned ducts 84 which lead into a trunk 85 running longitudinally of casing A on top 14 along the center of the same. A neck 86 formed at the center part of the trunk 85 connects the said trunk with a blower 87 which may be driven in any suitable manner so as to create a partial vacuum within the system comprising the trunk 85, ducts 84 and 83 and the pipes 80. This has the effect of drawing any steam or moisture liberated within the various chambers 42—45 into the pipes 80 through the perforations 81 therein, and of discharging the said steam into the atmosphere or into a suitable condenser as desired. In addition to the above means for removing steam from the evaporating chambers I provide a number of openings 88 in the top 14 of casing A. These openings communicate with a number of ducts 89 which in turn are connected with the trunk 85. By means of these last named openings any steam which may collect at the top of the evaporation chambers may be drawn off so that the entire amount of moisture collected within the same may be readily removed from the system. For regulating the suction within the various pipes 80 and the openings 88 and for controlling the amount of moisture drawn into the same I provide a number of valves 91 adapted to close communication from any of the pipes 80 with ducts 83 and a similar number of valves 92 adapted to close the openings 88 from communication with the ducts 89. By proper manipulation of these valves the suction can be regulated as desired and the moisture carried off as generated.

In the operation of the device as previously stated the raw substance passes through chamber 76 where it is brought up to the temperature requisite for the evaporation of the moisture from the same. As the same then passes through successive chambers 42—45 etc., the said substance is further heated and moisture gradually removed from it. When the substance finally passes through the last of these chambers the entire amount of moisture has been removed therefrom and the said substance comes out in a dry state as required, where the same may be removed from the carrier plates 32 as the same passes above pulley 26.

With my improved construction the humidity in each of the chambers substantially remains the same thus varying in relativity of the greatest humidity in the chamber 42 and decreasing to a practically dry state in the last of the chambers to the right of the machine. In this manner the substance is gradually dried which is accomplished in a most effective and efficient manner. It may be stated that the machine occupies a minimum amount of space and that the same is continuous in operation so that the machine is perfectly automatic in operation and that the substance upon leaving the machine is in exactly the condition desired.

My invention may be used for removing moisture from any product or commodity which can be heated to a sufficient degree of temperature to cause the moisture to evaporate from the same or where a slight evaporation is required the same may be evaporated without the use of heat by the omission of the heating system from the invention. The device may be used for drying peat, for making macaroni, for baking hard-tack, and similar articles and for removing the moisture from other substances of a similar nature.

In accordance with the patent statutes I have described the principles of operation of my invention, together with the apparatus which I now consider to represent the best embodiment thereof, but I desire to have it understood that the construction shown is only illustrative and that the invention can be carried out by other means and applied to uses other than those above set forth within the scope of the following claims.

I claim:—

1. A drier comprising a casing having a plurality of partitions forming a number of chambers therein, a continuous carrier passing through said chambers, a plurality of heating ducts passing transversely through said casing lying adjacent said partitions and means communicating on the exterior with said ducts.

2. A drier comprising a plurality of chambers, a continuous carrier passing successively through said chambers, ducts extending transversely through said chambers and rises connecting with said ducts.

3. A drier comprising a plurality of chambers, a continuous carrier passing successively through said chambers, ducts extending transversely through said chambers and risers connecting with said ducts and valves placing said ducts in communication with said risers.

4. A drier comprising a plurality of vertically positioned chambers and a horizontally positioned chamber immediately below said vertical chambers, a continuous conveyer passing first through said horizontal chamber and then successively through said second chambers, means for heating said horizontal and vertical chambers and means for removing the moisture from said second chambers.

5. A drier comprising a plurality of chambers, a continuous carrier passing through said chambers, suction pipes positioned transversely through said chambers and means connected with said suction pipes for withdrawing moisture from within said chambers through the same.

6. A drier comprising a casing having a plurality of partitions forming a number of chambers within the same, a continuous carrier passing through said chambers, a plurality of transverse suction pipes positioned adjacent said partitions and means upon the exterior of said casing for communicating with said pipes for withdrawing moisture from within the said chambers through said pipes.

7. A drier comprising a chamber having heating means along the bottom thereof, a continuous carrier positioned above said heaters, a sectional wall positioned between said heaters and continuous carrier and means for moving the sections of said wall to permit of the passage of heat through the same to said carrier.

8. A drier comprising a chamber having heating means along the bottom thereof, a continuous carrier positioned above said heaters, a normally imperforate wall positioned between said heaters and carrier and means for rendering said wall perforate to permit of the passage of heat through the same.

9. A drier comprising a casing having a continuous carrier within the same formed with a horizontal run and heating means uniformly distributed along said casing below said horizontal run.

10. A drier comprising a casing, a conveyer having a plurality of vertical runs, chambers formed within said casing, passageways formed between adjacent alternate chambers in the upper portions thereof, similar passageways formed between the said chambers at the lower portions thereof to form a continuous zig zag passageway, a partition extending completely across said casing immediately below said chambers, a second partition extending in parallel relation below said first horizontal partition to form a horizontal passageway, a continuous conveyer passing through said horizontal passageway and through said vertical chambers, heaters positioned beneath said lowest partition, and means for conducting heat therefrom to said horizontal passageway and to said vertical chambers.

11. A drier comprising a casing having a plurality of vertical chambers, heaters positioned in the bottom of said casing, and a plurality of zig zag flues connected with said heaters and extending along the walls of said vertical chambers, and a continuous carrier passing through said chambers.

12. A drier comprising a casing having a plurality of vertical chambers, a horizontal chamber positioned below the same, heaters positioned below said horizontal chamber, said horizontal chamber having a wall separating the same from said heaters, and means for admitting heated air from said heaters through said partitions to heat said chamber, and a continuous carrier passing through said horizontal and vertical chambers.

13. A drier comprising a casing having a plurality of vertical chambers, heaters positioned in the bottom of said casing, and a plurality of zig zag flues connected with said heaters and extending along the walls of said vertical chambers, vertical flues connected with said zig zag flues and valves for directing the gases from said heaters through any number of said zig zag flues or causing the same to travel directly upwardly through said vertical flues.

14. A drier comprising a casing having a plurality of vertically arranged chambers, continuous carriers passing successively through said chambers, a plurality of perforated pipes passing along the walls of said chambers, and suction means for withdrawing moisture from within said chambers and through said pipes.

15. A drier comprising a casing having a plurality of vertically arranged chambers, continuous carriers passing successively through said chambers, a plurality of perforated pipes passing along the walls of said chambers, openings formed through said chambers at the upper portions thereof and suction means for simultaneously drawing moisture through said pipes and said openings in the chambers.

16. A drier comprising a continuous carrier, and means for successively removing additional quantities of moisture from the substance dried as the carrier travels through the drier, and means for maintaining each portion of the substance within the same portion of the drier of the same relative humidity.

17. A drier comprising a plurality of chambers, a continuous carrier adapted to pass successively through said chambers and means for successively removing portions of moisture from the substance carried on the carrier so that the same is gradually reduced to a drier state as the carrier passes from one chamber to the other.

18. A drier comprising a casing, heating means positioned in the bottom of said casing, a continuous carrier passing through said casing above said heating means and a plurality of zigzag flues connected with said heating means and extending across said casing.

19. A drier comprising a casing, heating means positioned in the bottom of said casing, a continuous carrier passing through said casing above said heating means and a plurality of zigzag flues connected with said heating means and extending across said casing.

20. A drier comprising a casing having a plurality of heaters, a continuous carrier passing through said casing, said carrier having a run positioned directly over said heaters for bringing the temperature of the substance to be dried up to evaporating temperature, said carrier having other runs positioned remotely from said heaters, and means for further heating said runs by means of said heaters to evaporate the substance as the carrier travels.

21. A carrier comprising a casing, a plurality of heaters positioned within the casing, an endless carrier passing through the casing having a horizontal run positioned above said heaters and a sectional partition positioned between said horizontal run and said heaters by means of which heated air may be directed to said carrier or excluded therefrom at will.

22. A carrier comprising a casing, a plurality of heaters positioned within the casing, an endless carrier passing through the casing having a horizontal run positioned above said heaters, and a sectional partition positioned between said horizontal run and said heaters by means of which heated air may be directed to said carrier or excluded therefrom at will, and means for independently adjusting any of said sections to cause the heat to pass through the same at any point thereof or to exclude the heat from passing through the same as required.

In testimony whereof I affix my signature.

SWAN G. BONAPARTE.